United States Patent [19]

Rosaen

[11] Patent Number: 5,176,826
[45] Date of Patent: Jan. 5, 1993

[54] PURGE CONSTRUCTION FOR A VIBRATING SIEVE FILTER

[75] Inventor: Borje O. Rosaen, Ann Arbor, Mich.

[73] Assignee: Rosedale Products, Inc., Ann Arbor, Mich.

[21] Appl. No.: 601,194

[22] Filed: Oct. 19, 1990

Related U.S. Application Data

[63] Continuation-in-part of Ser. No. 323,415, Mar. 14, 1989, Pat. No. 4,970,004.

[51] Int. Cl.⁵ .................. B01D 33/48; B01D 33/54
[52] U.S. Cl. .................... 210/232; 210/388; 210/397; 210/409; 210/418; 210/433.1; 210/450; 210/451; 210/454; 210/497.01
[58] Field of Search ............. 210/232, 305, 312, 313, 210/388, 407, 409, 416.1, 418, 438, 450, 452, 454, 497.01, 251, 54, 397, 433.1; 55/292, 293, 300, 304, 525; 209/268, 273, 305, 306, 379

[56] References Cited

U.S. PATENT DOCUMENTS

| | | | |
|---|---|---|---|
| 3,161,591 | 12/1964 | Petter et al. | 210/251 |
| 3,195,729 | 7/1965 | Kracklauer et al. | 210/330 |
| 3,317,050 | 5/1967 | Daman | 210/331 |
| 3,387,712 | 6/1968 | Schrink | 210/411 |
| 3,867,291 | 12/1975 | Schmidt, Jr. et al. | 210/136 |
| 3,870,640 | 3/1975 | Reece | 210/388 |
| 4,419,240 | 12/1983 | Rosaen | 210/452 |
| 4,517,086 | 5/1985 | Romey et al. | 210/416.1 |
| 4,836,922 | 6/1989 | Rishel et al. | 210/388 |
| 4,970,004 | 11/1990 | Rosaen | 210/741 |

FOREIGN PATENT DOCUMENTS 129179  2/1987  U.S.S.R. .............. 210/388

Primary Examiner—Robert A. Dawson
Assistant Examiner—Matthew O. Savage
Attorney, Agent, or Firm—Gifford, Groh, Sprinkle, Patmore and Anderson

[57] ABSTRACT

A vibrating sieving unit for insertion into a housing to form a sieving filter. The vibrator directly vibrates the sieving cylinder reducing the buildup of filter cake for improved performance. A unique cleaning-in-place system is presented utilizing the fluid being filtered as the purging liquid. An alternate purge construction is also provided for use if the first purge route is blocked.

17 Claims, 2 Drawing Sheets

PURGE CONSTRUCTION FOR A VIBRATING SIEVE FILTER

CROSS REFERENCE TO RELATED APPLICATION

This is a continuation-in-part application of Ser. No. 07/323,415 filed Mar. 14, 1989 now U.S. Pat. No. 4,970,004 issued Nov. 13, 1990 for a Vibrating Sieve Filter.

BACKGROUND OF THE INVENTION

1. Field of the Invention

This invention relates to filtering of liquids, to a vibrating sieve filter, a method of cleaning in place or purging the undesirable materials, and, more particularly, to a filter which includes a secured purging arrangement which is operable in the event that a first purging system is clogged.

2. Description of the Prior Art

Liquids used in industrial processes often require selective filtering to eliminate only the undesirable contaminate particles. Typically, this is accomplished with a bag type semi-permanent or disposable filter in which the liquid being filtered is passed through a bag in a basket support. Alternatively, disposable cartridge filters of various configurations are used. The surfaces of these types of filters become quickly clogged with materials including the removal of material which is desired to be retained.

Improved performance in filtration has been accomplished in many instances by the adaption of sieving techniques. A cylindrical perforated steel basket with a screen covering replaces the cloth or paper composition bag. The cylindrical screen is placed in a cylindrical casing or housing and the liquid to be filtered is generally admitted at the bottom of the housing for flow through the screen to the interior of the screen cylinder and upwardly to a top outlet In some instances a space is left between the bottom of the screen cylinder and a housing to provide a vibrator which induces vibration into the incoming liquid helping to keep the smaller particles in suspension for improved sieving.

When a bag type or sieving type filter becomes clogged, in-place cleaning is typically accomplished by backwashing which involves piping a cleaning fluid through the normal filter outlet for discharge through the normal filter inlet. Piping for this type of purge is cumbersome, and down time for purge is often excessive, requiring multiple filters in parallel to allow sequential backwash purging.

When the filter becomes clogged to such an extent that in-place cleaning is ineffectual, disassembly of piping is sometimes necessary to remove the filter for cleaning or replacement.

Applicant's co-pending application Ser. No. 07/323,415 discloses and claims an improved vibrating sieve filter which is constructed and arranged to overcome these deficiencies in the prior art filters of this type. The present invention is an improvement of the vibrating sieve filter device of my co-pending application. A second or alternative bypass system is provided which functions in the event that the first bypass becomes clogged.

SUMMARY OF THE INVENTION

As set forth in my co-pending application, the foregoing improvements and other advantages of the invention have been embodied in a vibratory sieve unit which is inserted into a housing to form a sieving filter. The sieving filter can be supplied complete with the housing, seals and other accessories such as valves, or the sieving unit can be incorporated in an installed housing previously employing a bag type filtering unit or a sieve type unit. The vibrating sieve unit includes a closure for sealing the open top of the housing. In the case of a new installation, the closure is in the form of a simple cover employing an O-ring to seal to a generally cylindrical housing. A sieving cylinder having an open top and a closed bottom is attached to the closure by the means of a longitudinally extending support member which is connected at one end to the closure and at the other end to the bottom of the sieving cylinder. A fluid actuated vibrator is attached to the support member adjacent to the bottom of the sieving cylinder for supplying vibrations to the cylinder. A pair of longitudinally extending resilient conduits are connected between the closure and the vibrator for supplying and exhausting a motive fluid for operation of the vibrator. Normally, the motive power is clean factory air at 25-60 psi.

The generally cylindrical housing has an open top and a horizontal inlet through the side wall adjacent the top for the fluid being filtered. The bottom of the housing is closed with a filtered fluid outlet. The vibrating sieve unit is inserted into the housing with the seal between the housing and the sieving cylinder, located so that fluid being filtered, which is introduced through the inlet, will be directed into a first chamber inside of the sieving cylinder. The fluid, along with the smaller particles, desirably retained then passes through the sieving cylinder with the larger particles being removed by the sieve falling to the bottom of the cylinder. The fluid passes into a second chamber between the sieving cylinder and the housing and then is exhausted through the filtered fluid outlet. The vibration is supplied directly to the sieving cylinder to prevent buildup of a filter cake of small particles on the surface and to promote the passage of the filtered fluid with particles below a given size through the sieve cylinder.

Because the sieving cylinder of the filter is directly vibrated it becomes ideal for paints, medicines, paper coatings, foods and other products containing desirable solids that can be classified by size. For example, metallic automotive paints use mica particles as an ingredient. Larger particles clog the spraying nozzles. Contact of most of the larger mica particles with the vibrating sieving cylinder actually breaks them down to a size which will pass through the cylinder and not clog the paint spraying nozzles. The larger particles will be retained in the sieving cylinder as a "contaminate".

A quick disconnect device is used for attaching the closure to the top of the housing. Preferably, this takes the form of three swinging eye bolts attached to the casing which draw the closure down in sealing relationship to the housing with the tightening of yoke-type nuts. External air supply and exhaust lines to the closure are normally made with flexible tubing so that the closure is easily removed from the casing carrying the entire vibrating sieve unit with it.

The sieving cylinder is attached to the vibrator casing which forms a part of the support member by a tapered plug connector which transmits the vibrations from the vibrator unit to the sieving cylinder but allows easy detachment for cleaning of the sieving cylinder or replacement thereof. The sieving cylinder can also be easily cleaned while still assembled to the sieve unit by inserting the cylinder into a solvent container with the vibrator operating to quickly dislodge the contaminate from the sieving cylinder mesh.

The present invention provides an improvement over the vibrating sieve filter unit of my co-pending patent application, the construction and arrangement of which is essentially as described above. The improvement will now be discussed.

A contaminate effluent line for a first purge route extends from a point close to the bottom of the sieving cylinder through the closure for discharging a flow of fluid carrying particulate contaminate matter during the cleaning-in-place purging cycle. The sieving cylinder support member is in the form of a pipe which serves a dual purpose of providing support for the sieving cylinder and providing the effluent line. If the first purge route becomes blocked, an alternate purge route is employed. The alternate purge route uses a second contaminate effluent line also extending from a point close to the bottom of the sieving cylinder.

When the sieving filter is installed, a valve is placed in the line attached to the filtered fluid outlet and in the contaminate effluent line. A differential pressure gauge is normally supplied between the fluid inlet and outlet to the filter. When the pressure drop across the filter increases to a preset value, typically 20 psi, this is an indication that the sieving cylinder has been clogged with accumulated contaminate so that a purging cycle is necessary. The unique cleaning-in-place cycle of the invention is initiated by closing the valve in the filtered fluid outlet line and opening the valve in the contaminate effluent line. The normal flow of fluid being filtered passes through the housing inlet into the inside of the sieving cylinder where it flows downwardly to pick up particulate contaminate matter along the inside surface of the sieving cylinder. A cone deflector at the bottom of the vibrator deflects this flow downwardly against the closed bottom of the sieving cylinder to pick up additional accumulated particulate contaminate. Entrance to the effluent line of the first purge route is within the cone deflector at the center so that the liquid carries the contaminate from the bottom of the sieving cylinder through the closure at the top to a discharge line.

The second purge route is an alternative route in case the first route should become blocked. A second purge passage is provided and includes a spring biased valve which opens when a pressure increase indicates the first purge path is blocked. Opening the valve opens a second path to discharge contaminate liquids from the filter device.

The foregoing advantages and others will become more apparent from the following description and the accompanying drawing.

DETAILED DESCRIPTION OF THE PREFERRED EMBODIMENTS OF THE INVENTION

Figure 1:
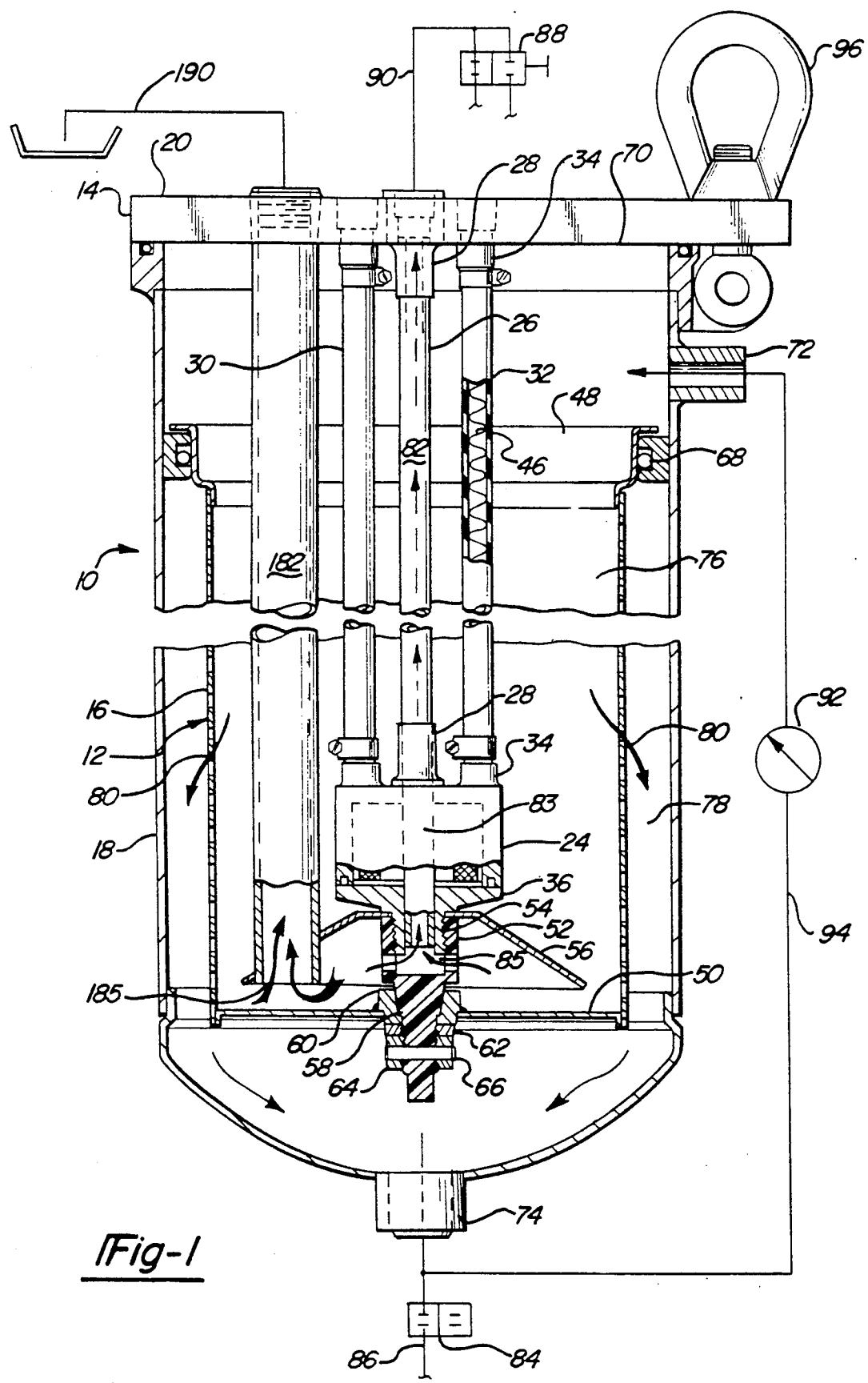
FIG. 1 is a schematic elevational view partially in section showing the vibrating sieve unit of this invention inserted into a housing to form the sieving filter of the invention, and additionally showing the first purge discharge line to facilitate cleaning-in-place and the second purge discharge line according to the new method of this invention.

Referring to FIG. 1, the sieving filter 10 of this invention is shown as including the vibrating sieve unit 12 which is inserted into housing 18 to form the completed sieving filter.

The vibrating sieve unit includes a closure 14, which in the case of the complete sieving filter 10 shown in FIG. 1 is a simple cover plate 20.

Figure 2:
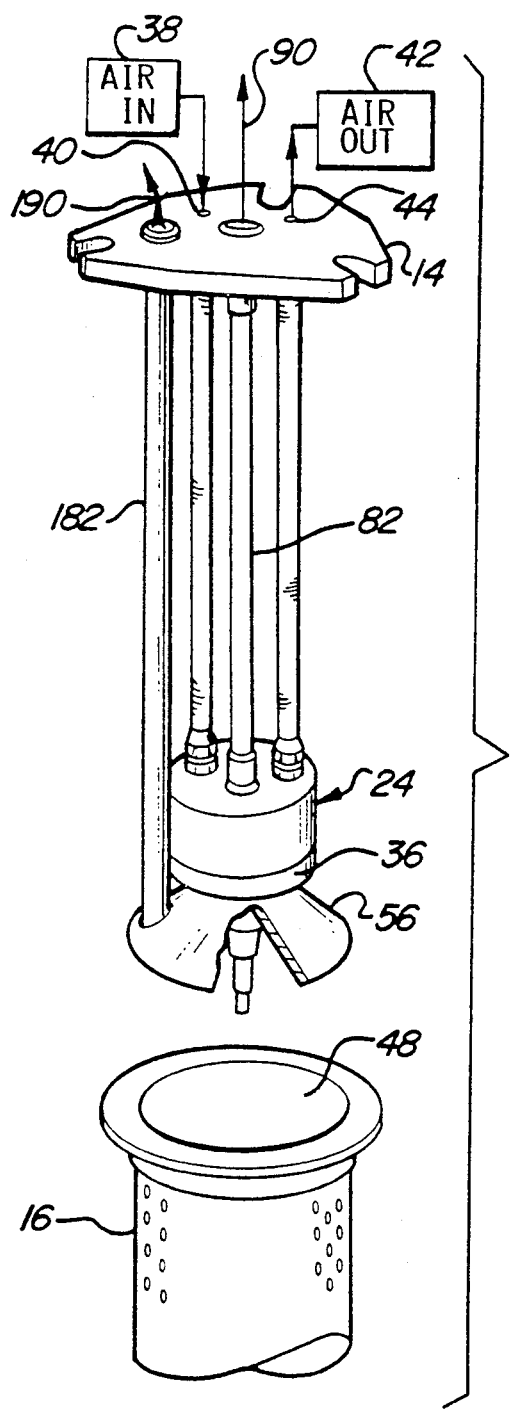
FIG. 2 is an exploded perspective view of the sieving filter of this invention showing the construction of the vibrating sieve unit and the effluent lines for the first and second purge routes.

The vibrator unit 24 is assembled to the closure 14 by a longitudinally extending support member 26 which takes the form of a pipe assembled to the closure and vibrator unit by fittings 28. The vibrator 24 is a commercially available turbine driven type. Resilient tubing is used for the fluid inlet conduit 30 and exhaust conduit 32 which are connected by suitable fittings 34 to the closure 14 and vibrator 24. Typically, the motive fluid for the vibrator 24 is clean available plant air at 25-60 psi, as best shown in FIG. 2 supplied at 38 through an inlet port 40 in closure 14. The air is exhausted at 42 through an exhaust port 44 in closure 14. The air pressure is varied between 25 and 60 psi to change the vibration frequency to the frequency best suited for the product being filtered. Frequency increases with increase in pressure. Reinforcing springs 46, as best shown in FIG. 1, are used inside of the fluid conduits 30 and 32 to prevent collapse of these resilient tubes which may have very little internal air pressure but which are exposed to the filter fluid pressure which may be much higher.

Sieving cylinder 16 disposed in the housing 18, has an open top 48 and a closed bottom formed by plate 50. The sieving cylinder is typically a stainless steel basket having large perforations of the order of $\frac{1}{8}$ inch diameter for unimpeded flow of fluid. The basket is lined with a filtering sieve element which controls the maximum size of particles which pass through the sieving cylinder. Wedgewire-lined and wire cloth lined baskets are readily available with a variety of opening sizes. The wedgewire-lined baskets have greater abrasion resistance, while the wire cloth lined baskets present a much higher percentage of open area so that with a given flow the fluid passes through the sieving filter with less pressure drop. Since the particular structure of the basket lining is not part of the claimed invention, the sieving cylinder is shown as an integral structure.

The sieving cylinder 16 is attached to the support member 26 by a tapered plug member 52 which engages a threaded boss 54 of vibrator housing 36, as best seen in FIG. 1. Conical deflector 56 is held by this connection. The tapered shank 58 of plug 52 engages the tapered hole in boss 60 of bottom plate 50. The connection is secured by nut 64 with lock-washer 62 and secured with a roll pin 66. This firm connection transmits the vibration of vibrator 24 to the sieving cylinder 16, which vibrates about O-ring seal 68 between the sieving cylinder 16 and housing 18. The use of resilient tubing for the vibrator conduits 30 and 32 in combination with seal 68 provides a resilient mounting for the sieving cylinder 16.

Vibrating sieve unit 12 is assembled by insertion of the sieving cylinder 16 through the open top 70 of housing 18. Seal 68 engages the housing wall below fluid inlet 72. The filtered fluid outlet 74 is shown at the bottom of casing 18. The flow of fluid during filtering is through fluid inlet 72 into the open top 48 of the sieving cylinder 16 to a first chamber 76 within the cylinder 16 and out through the sieving cylinder 16 to a second chamber 78 between the sieving cylinder 16 and the housing 18. This flow of fluid from the first chamber within the sieving cylinder through the sieving cylinder wall to the second chamber is shown by the arrows 80 in FIG. 1. The larger particles which are screened out by the sieving cylinder 16 fall to the bottom of the sieving cylinder. The positive vibration of the cylinder reduces the buildup or caking of finer particles against the sieve openings allowing the finer material to pass through with the liquid being filtered.

For cleaning-in-place a first purge flow routes through a first contaminate effluent passage 82 supplied in the interior of the support pipe 26 and continues through the vibrator casing at 83, terminating in ports 85 in tapered plug 52 within the conical deflector 56 at the bottom of chamber 76 in the sieving cylinder 16. As best seen in FIG. 1, a shutoff valve 84 is placed in discharge line 86 from the filter fluid outlet 74, and a shutoff valve 88 is placed in line 90 connected to said first contaminate effluent line 82. A differential pressure gauge 92 is placed in a line 94 to measure the pressure drop across the sieving filter. When the pressure builds up across the filter element by an increasingly clogged surface, it can be detected by gauge 92. When this pressure difference becomes excessive, it is desirable to clean the filter. This can be accomplished by closing the valve 84 in discharge line 86 and opening the valve 88 in effluent outlet line 90. The fluid then entering inlet 72, which would be normally filtered, can be used to perform a purging or cleaning operation. The first purge route moves the fluid through inlet 72 into the open top 48 of the sieving cylinder 16 into the first chamber 76 inside of the cylinder. The fluid is directed by the conical deflector 56 downwardly towards the bottom plate 50 of the sieving cylinder to pick up accumulated particulate matter for exit through the ports 85 and contaminate effluent conduit 83, 82. This presents a unique method of cleaning the sieving filter in place, minimizing the frequency of basket removal with extended system interruption and avoiding the complexity and problems attendant with a backwashing procedure.

An alternate purge can be used when the first purge method becomes blocked. The fluid enters through inlet 72 and is directed by the conical deflector 56 downwardly towards the bottom plate 50 of the sieving cylinder to pick up accumulated particulate matter, as in the first purge route. If port 85 or effluent line 82 should be blocked, the second purge route using effluent line 182 operates as an alternative.

Figure 3:
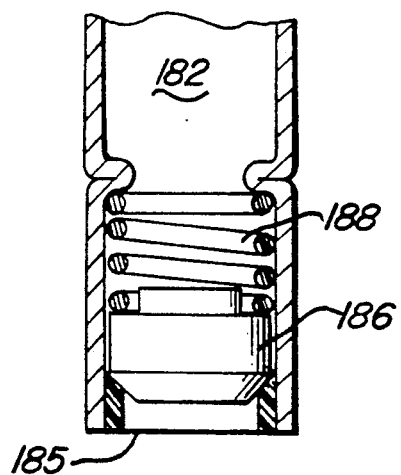
FIG. 3 is a partial sectional view showing the purge plug for the second purge route of this invention.

A purge plug 186 is mounted in the effluent line 182 at the outlet port 185. The purge plug 186, best shown in FIG. 3, uses a spring 188 to keep it in the normally closed position. When the pressure builds up in the filter from a blocked first purge route, the pressure from the fluid overcomes the spring tension and allows the fluid to exit through contaminate effluent line 182 and line 190.

With some fluids being filtered, a continuous purge can be used by, partially opening valve 88 connected to the contaminate effluent line tallow a portion of the fluid being filtered to flow out through the contaminate effluent line 82 continuously cleaning sieving cylinder 16.

The closure 14 or cover 20 is held locked to the casing 18 by a quick disconnect system using spaced swinging eye bolt assemblies 96 attached to the casing 18 and drawing the cover 20 into sealing contact with the casing by threading the yoke nuts 98 of the assemblies into contact with the top surface of the cover. This permits quick removal of the vibrating sieving unit from the casing for further cleaning or replacement of the sieving cylinder 16. For example, corrosive deposits on the sieving cylinder that cannot be removed by the cleaning-in-place purge can often be removed by placing the sieving cylinder of the vibrating sieving unit into a solvent tank with the vibrator working so that the vibratory action quickly separates the contaminate from the mesh of the sieving screen cylinder. The sieving cylinder screen 16 can be easily removed from the vibrating sieving unit 12 by removing pin 66, nut 64, and lock-washer 62.

The foregoing detailed description of the structure and operation of the present invention has been given for clearness of understanding only and no unnecessary limitations should be understood therefrom. Some modifications will be obvious to those skilled in the art to which the invention pertains, without deviation from the spirit of the invention as defined by the scope of the dependent claims.

I claim:

1. A vibrating sieve unit for insertion into a housing to form a sieving filter, said housing having an open top with an inlet adjacent thereto for fluid to be filtered and a closed bottom with a filtered fluid outlet, said unit comprising, in combination:

closure means for sealing the open top of said housing;

a sieving cylinder having a closed bottom disposed in said housing;

a longitudinally extending support member having one end extending into said sieving cylinder;

means for attaching said support member at an end opposite said one end to said closure means and means for attaching said one end to the bottom of said sieving cylinder;

a fluid actuated vibrator attached to said support member for vibrating said sieving cylinder;

a pair of longitudinally extending resilient conduits connected between said closure means and said vibrator for supplying and exhausting motive fluid for operation of said vibrator;

means for attaching said closure means to the open top of said housing with said sieving cylinder within said housing to complete assembly of said sieving filter;

sealing means between said housing and said sieving cylinder located so that fluid being filtered introduced through said inlet will be directed into a first chamber inside of said sieving cylinder, through said sieving cylinder into a second chamber between said sieving cylinder and said housing, and out of said second chamber through said filtered fluid outlet;

a first contaminate effluent line disposed within said sieving cylinder, said first contaminate effluent line extending from adjacent the closed bottom of said sieving cylinder through said closure means for discharging a flow of fluid from said inlet through said first chamber as it picks up a particulate contaminate matter from said sieving cylinder and said first chamber; and a second alternate contaminate effluent line disposed with said sieving cylinder, said second contaminate effluent line extending from adjacent the closed bottom of said sieving cylinder through said closure means for discharging a flow of fluid from said inlet through said first chamber as it picks up particulate contaminate matter from inside said sieving cylinder and said first chamber when said first effluent line is blocked.

2. The vibrating sieve unit of claim 1 wherein said means for attaching said closure means to the top of said housing includes a plurality of swinging eye bolts acting between said housing and said closure means.

3. The vibrating sieve unit of claim 1 wherein said closure means includes a cover for sealing directly to said housing said cover having inlet and outlet ports therethrough to which said resilient conduits are connected for connection to external fluid supply and exhaust lines.

4. The vibrating sieve unit according to claim 1 wherein the means for attaching said support member to the bottom of said sieving cylinder includes a tapered plug and socket assembly.

5. The vibrating sieve unit according to claim 1 wherein said first contaminate effluent line is contained at least in part within said longitudinally extending support member.

6. The vibrating sieve unit according to claim 5 further including a conical deflector connected to said support member for directing the flow of fluid within said first chamber toward the closed bottom of said sieving cylinder into said first and second effluent lines.

7. The vibrating sieve unit according to claim 6 wherein said vibrator has an outer housing to which said conical deflector is attached, said conical deflector diverging outwardly from said vibrator toward the closed bottom of said sieving cylinder; and said first and second effluent lines terminate at a point between said conical deflector and said closed bottom of said sieving cylinder.

8. The vibrating sieve unit according to claim 7 wherein the means for attaching said support member to the bottom of said sieving cylinder includes a tapered plug threaded onto said vibrator housing and holding said conical deflector therebetween, said tapered plug having a passage providing fluid communication between said first effluent line and said first chamber within said conical deflector and having a tapered shank which engages a tapered socket in the closed bottom of said sieving cylinder.

9. The vibrating sieve unit according to claim 7 wherein said first effluent line contains valve means for controlling a flow of contaminate matter through said first effluent line.

10. The vibrating sieve unit of claim 1 further including a first valve downstream of said filtered fluid outlet and a second valve in said first contaminate effluent line whereby during normal filtering said first valve will be open and said second valve will be closed so that fluid being filtered will flow from said inlet through said first chamber, through said sieving cylinder into said second chamber, and out through said filtered fluid outlet, and during filter cleaning, said first valve can be closed and said second valve can be opened so that fluid passing through said inlet will pass through said first chamber picking up particulate contaminates from said sieving cylinder and said first chamber to pass out through said first contaminate effluent line.

11. The vibrating sieve unit according to claim 10 wherein said second valve is a throttling valve so that during normal filtering when said first valve is fully open, said second valve can be partially opened tallow a portion of the fluid being filtered to flow out through said first contaminate effluent line to continually clean said sieving filter.

12. The vibrating sieve unit of claim 1 further including a reinforcing spring within and extending the length of each of said resilient conduits for withstanding a greater collapsing pressure of fluid in said first chamber than the pressure of the motive fluid within said conduits.

13. A vibrating sieving filter comprising, in combination:
- a generally cylindrical housing having a generally vertical axis, said housing having an open top, a horizontal inlet adjacent said top for fluid being filtered and a closed bottom, and a filtered fluid outlet disposed below said horizontal inlet;
- a cover for sealingly closing said open top of said housing;
- a sieving cylinder having an open top and a closed bottom disposed in said housing;
- a vertical extending support member extending into said sieving cylinder removably attached at one end to said closed bottom of said sieving cylinder and attached at the other end to
- said cover to support said sieving cylinder concentrically within said housing with said open top located below said horizontal inlet;
- a resilient seal disposed between said housing and said sieving cylinder located adjacent said open top of said sieving cylinder and below said horizontal inlet in said housing so that fluid being filtered which is introduced through said horizontal inlet will be directed through the open top of said sieving cylinder into a first chamber inside of said sieving cylinder, through said sieving cylinder to a second chamber between said sieving cylinder and said housing, and out of said second chamber through said filtered fluid outlet;
- a fluid actuated vibrator attached to said support member for vibrating said sieving cylinder, said resilient seal serving as a vibration fulcrum point;
- a pair of vertically extending resilient conduits connected between said cover and said vibrator for supplying and exhausting motive fluid for operation of said vibrator;
- means for removing fluid to a location outside said housing to remove contaminated effluents from said sieving cylinder, said means for removing being a pair of conduits disposed within said sieving cylinder; and
- quick disconnect means for attaching said cover to said housing so that said cover and said sieving cylinder are easily removed as a unit from said housing permitting said sieving cylinder to be removed from said support member for cleaning and servicing said sieving cylinder and vibrator.

14. A vibrating sieving filter comprising, in combination:
- a generally cylindrical housing having a generally vertical axis, said housing having an open top with a horizontal inlet adjacent said open top for fluid being filtered and a closed bottom with a vertically disposed filtered fluid outlet;
- a closure for sealingly closing the open top of said cylindrical housing;

a sieving cylinder having an open top and a closed bottom disposed within said cylindrical housing;

a vertically extending support member extending through said sieving cylinder, said support member including means for removably attaching one end to the closed bottom of said sieving cylinder and means for attaching the other end to said closure to support said sieving cylinder within said housing;

a fluid actuated vibrator attached to said support member for vibrating said sieving cylinder;

a pair of longitudinally extending resilient conduits connected between said closure and said vibrator for supplying and exhausting motive fluid for operation to said vibrator;

quick disconnect means for attaching said closure to said housing so that said closure and said sieving cylinder are easily removed, as a unit, from said housing and said removal of said sieving cylinder from said housing permitting said sieving cylinder to be removed from said support member for cleaning and servicing said sieving cylinder and said vibrator;

a first contaminate effluent line extending through said closure into said sieving cylinder and terminating adjacent the closed bottom of said sieving cylinder, said first contaminate effluent line being contained at least in part within said vertically extending support member;

a second contaminate effluent line extending through said closure into said sieving cylinder and terminating adjacent the closed bottom of said sieving cylinder;

a shutoff valve downstream of said filtered fluid outlet;

a cleaning mode valve disposed in said first contaminate effluent line; and a resilient seal between said housing and said sieving cylinder which serves as a fulcrum point for the vibration of said sieving cylinder and which assures that the fluid being filtered will flow from said inlet into a first chamber inside of said sieving cylinder; and when said shutoff valve is open and said cleaning mode valve is closed said fluid will flow through said sieving cylinder into a second chamber between said sieving cylinder and said housing and out of said second chamber through said filtered fluid outlet in a normal filtering mode;

when said shutoff valve is closed and said cleaning mode valve is open said fluid will pass through said first chamber picking up particulate contaminates from within said sieving cylinder and said first chamber and pass out through said first contaminate effluent line in a cleaning mode; and when said shut off valve is closed, and said cleaning mode valve is closed, and said first contaminate effluent line is blocked by said particulate contaminates, said fluid passes out through said second contaminate effluent line in a cleaning mode.

15. The vibrating sieving filter according to claim 14 further including a conical deflector for directing the flow of fluid within the first chamber toward the closed bottom of said sieving cylinder and into at least said first contaminate effluent line when the filter is in a cleaning mode with the shutoff valve closed and the cleaning mode valve open.

16. The vibrating sieving filter according to claim 14 wherein the means for attaching said support member to the closed bottom of said sieving cylinder includes a tapered plug and socket assembly which transmits the vibration of said vibrator to said sieving cylinder.

17. A filter device including a housing having an inlet an outlet and a fluid chamber disposed between said inlet and said outlet;

a hollow filter element disposed within said fluid chamber between said inlet and said outlet to filter particulates from fluid flowing through said filter device between said inlet and said outlet said hollow filter element defining an interior space and having an opening fluidly connecting said interior space to said inlet, said inlet space defining an inlet side of said filter element;

first conduit means operable upon actuation for directing a flow of fluid from said inlet side to a location outside said fluid chamber of said filter element to clean the inlet side of said filter element, said first conduit means having a portion disposed within said interior space of said filter element; and second conduit means operable upon said first conduit means being blocked by said particulates to direct a flow of fluid from said inlet side of said filter element to a location outside of said fluid chamber to clean said filter element, said second conduit means having a portion disposed within said interior space of said filter element; and means for stopping flow through said first conduit means and actuating flow through said second conduit means upon said first conduit means being blocked by said particulates.

* * * * *